June 23, 1964 — F. E. COLLETTE — 3,138,235
CONVEYOR CONTROL MECHANISM
Filed March 21, 1961 — 4 Sheets-Sheet 1

INVENTOR.
FLOYD E. COLLETTE
BY
ATTORNEY

June 23, 1964     F. E. COLLETTE     3,138,235
CONVEYOR CONTROL MECHANISM

Filed March 21, 1961     4 Sheets-Sheet 2

INVENTOR.
FLOYD E. COLLETTE
BY
Frederick C. Meyers
ATTORNEY

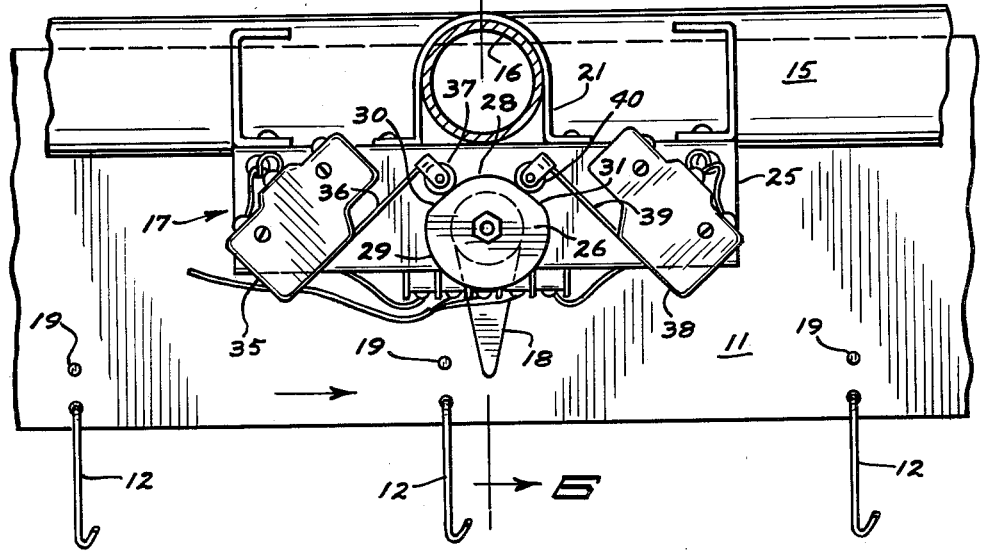
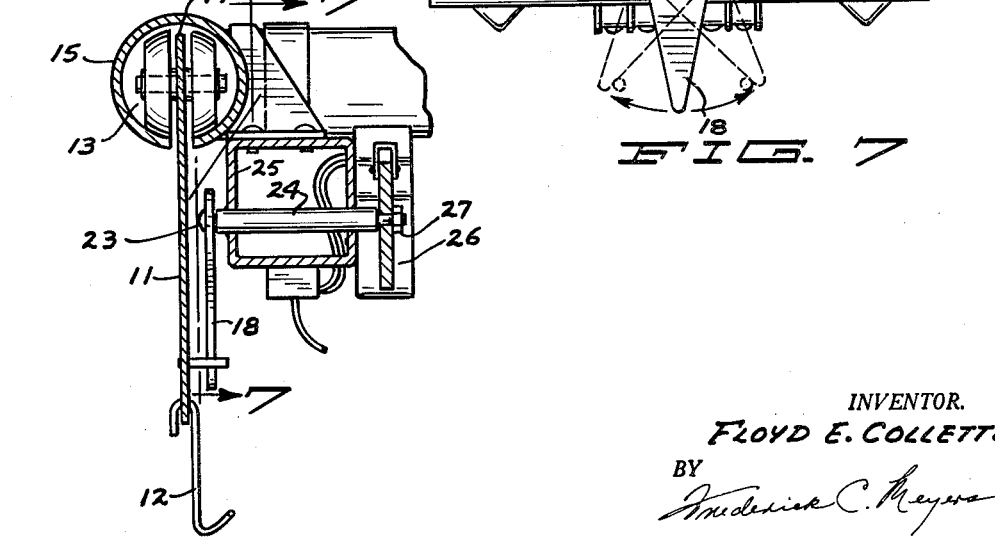

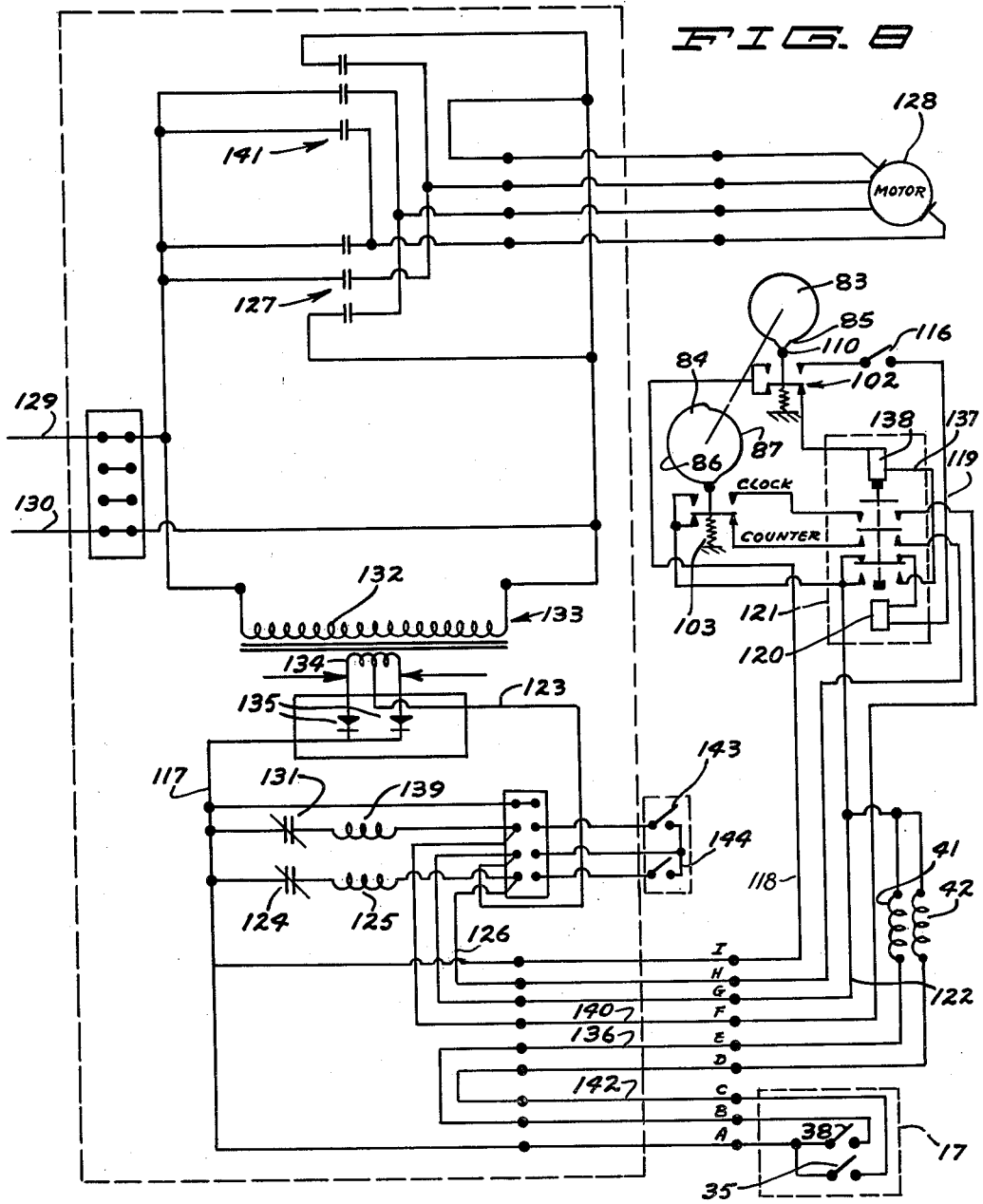

United States Patent Office 3,138,235
Patented June 23, 1964

3,138,235
CONVEYOR CONTROL MECHANISM
Floyd E. Collette, 713 4th St., Farmington, Minn.
Filed Mar. 21, 1961, Ser. No. 97,361
9 Claims. (Cl. 198—40)

This invention relates to conveyor controls and more particularly to a control device for predetermining the travel and stopping position of a conveyor.

In many instances, it is desirable to control the operation of a moving multi-sectioned conveyor element so that a given section will travel to a certain fixed location and then stop. While manual operation of a drive motor for such moving elements can be easily effected, the operation becomes impractical if there are a great number of operations to be performed and the attention of the operator is required through each cycle. An example of such mechanisms is an endless conveyor having hangers, containers or the like located at intervals therealong wherein it is desired to move any particular section of the conveyor to a single fixed station where articles may be placed or removed from the section. If the section which is wanted lies close to the station, the manual operation is easy, but since most of the sections are remote from the station, considerable time may be required before the conveyor has moved to the resired position. The problem is further complicated if the temporary position of the desired section is not known or if the drive motor causes the conveyor to run in but one direction. In the latter instance, if the desired section lies just beyond the fixed station, then the conveyor must make almost a full revolution before the section again arrives at the station.

It is within the contemplation of the instant invention to overcome the foregoing difficulties in commanding a moving conveyor to stop with one of a number of prescribed conveyor sections at a given fixed location and to provide a control mechanism which will be efficient in operating such conveyor with a minimum of effort on the part of the operator.

More specifically, it is an object of the invention to provide a control apparatus for a traveling conveyor which will be responsive to physical movement of the conveyor and will maintain the conveyor in travel until the desired section has arrived at a fixed station.

Another object of the invention is to provide an endless conveyor control which will automatically select the shortest return route for any section of the conveyor to a fixed station.

A further object is to provide a control which will be safe and trouble free during operation and will not require the attention of an operator once a dial selection has been made and the control unit started.

A still further object of the invention is to provide a call control for conveyors wherein articles are positioned at sections along the conveyor and the advance of each section past a sensing element will cause a gear train to be advanced by one tooth, said control being adapted to simply receive, with inexpensive versatility, any one of a number of change gears whose numbers of teeth are proportional to the number of sections established along the conveyor.

These and other objects and advantages of my invention will more fully appear from the following description, made in connection with the accompanying drawings, wherein like reference characters refer to the same or similar parts throughout the several views and in which:

FIGURE 5 is a front elevation of the sensing element and a segment of a conveyor belt adjacent thereto;

FIGURE 6 is a vertical section taken on the line 6—6 of FIGURE 5;

FIGURE 7 is a rear elevation of the sensing element, the frame on which it is mounted being in vertical section and the view being taken on the line 7—7 of FIGURE 6; and FIGURE 8 is a wiring diagram for the entire control mechanism.

Figure 3:
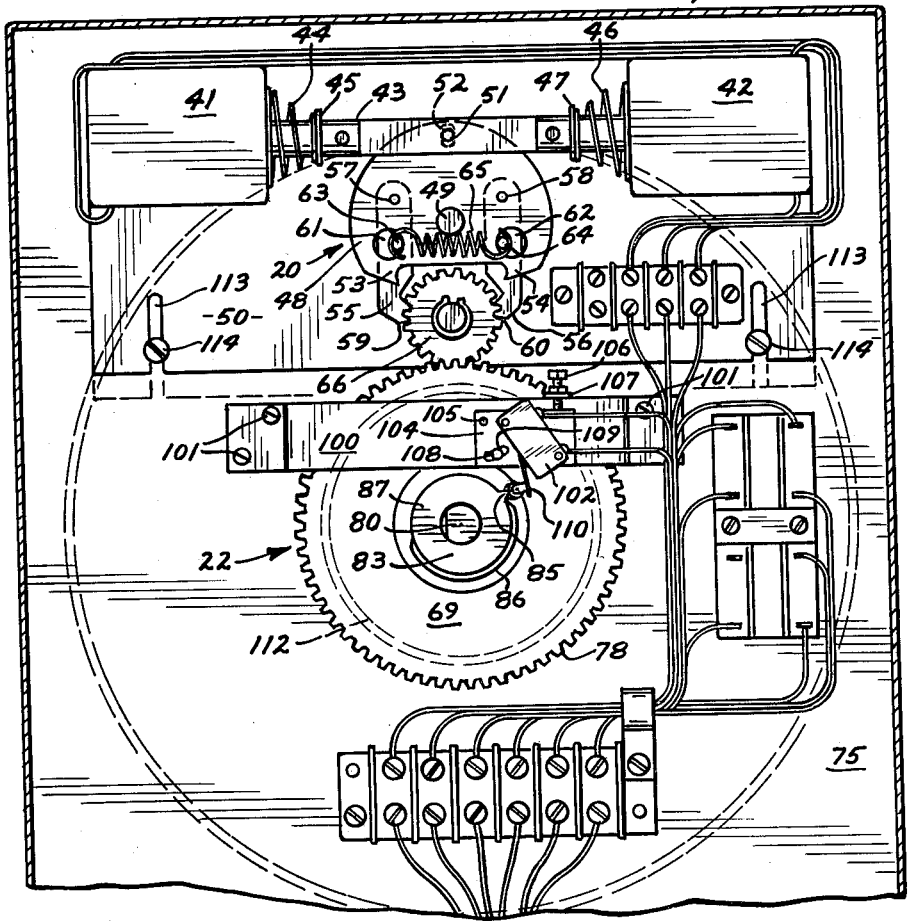
FIGURE 3 is a bottom plan view of the control mechanism, the control box being partly cut away and sectioned to expose the internal parts.

With continued reference to the drawings:

My conveyor control mechanism constitutes a control box shown generally at 10 which is adapted to be associated with a conveyor at some convenient fixed location where articles may be removed from or placed upon the conveyor. The control mechanism 10 is adapted to be manually present to determine the position at which the conveyor will stop in its travel. The invention is adaptable to any type of conveyor having an elongated character and being subdivided into contiguous sections, any one of which can be called and stopped at a fixed location. Referring to FIGURE 5, a form of conveyor is shown generally at 11 which constitutes a traveling belt having hooks 12 each constituting a section of the conveyor. Belt 11 may have roller elements 13 as shown in FIGURE 6 which are in turn secured to an upper margin 14 of belt 11 and disposed within a tubular track 15 which in turn constitutes a part of and is secured to frame 16. A sensing element indicated generally at 17 has a movable portion such as finger 18 which lies in the pathway of abutments or protuberances 19 respectively associated each with a section having a hook 12 shown in FIGURES 5 and 6. When the conveyor belt 11 travels in the direction of the arrow in FIGURE 5, each abutment 19 will strike the portion 18 of sensing element 17 causing it to actuate a gear driving element 20 located within the control box 10 as shown in FIGURE 3. The sensing element 17 may be secured to frame 16 by bracket means 21 as shown in FIGURE 5 and may be secured closely adjacent the control box 10, or remote from it, as desired. The gear driving element 20 imposes a stepwise movement through gear means forming a part of indicator assembly 22 which in turn indicates at all times the position of conveyor belt 11 relative to a fixed location arbitrarily selected with respect to frame 16.

Returning now to the sensing element 17 as shown in FIGURES 5 through 7. The movable portion 18 may constitute a finger secured by means of nut 23 to shaft 24 which is journaled within a supporting frame 25 affixed to the bracket 21 which in turn is affixed to frame 16 as previously described. The shaft 24 extends oppositely from finger 18 where it passes through cam 26 and is rigidly secured thereto by means of nut 27 threadedly secured thereagainst. Cam 26 has a low portion 28, a high portion 29, and two sloping portions 30 and 31 as shown in FIGURE 5. The finger 18 is maintained normally in downwardly depending position by means of a spring 32, one end of which is anchored at 33 to the support 25 and the other end of which is secured at 34 radially outward from shaft 24 as shown in FIGURE 7.

A micro-switch 35 is also secured to the support 25 and is provided with a switch arm 36 terminating in a cam roller 37 normally in contact with the low portion 28 of cam 26 to maintain micro-switch 35 in open condition. Similarly, a micro-switch 38 is secured to the right of cam 26 against support frame 25 as shown in FIGURE 5. The micro-switch 38 is provided with a switch arm 39 having a cam roller 40 which is also normally in contact with the low portion 28 of cam 26 when the cam finger 18 lies in downward vertical position, it maintains micro-switch 38 normally in open position in the same manner as micro-switch 35.

Now, however, it may be seen that when conveyor belt 11 travels in the direction of the arrow in FIGURE 5, an abutment 19 will strike the finger 18 thus causing cam 26 to rotate in a counterclockwise direction. Switch arm 36 of micro-switch 35 will remain in contact with the low cam surface 28, but the roller 40 of switch arm 39 will be caused to ride upon the sloping area 31 and up to the high portion 29 and thus close the micro-switch 38. As soon as the abutment 19 is passed, the cam finger 18 will snap back to its vertical position under influence of spring 32 thus bringing the micro-switch back to an open condition. If the belt conveyor 11 travels in the opposite direction to the arrow, then another abutment 19 will strike the cam finger 18 from the opposite side causing micro-switch 35 to momentarily close while maintaining micro-switch 38 in an open condition.

Referring now to FIGURE 3, whenever an electric pulse is transmitted through micro-switch 35, the solenoid 41 will be energized and whenever micro-switch 38 closes, the solenoid 42 will be energized. Only one of the solenoids 41 and 42 can be energized at one time. These solenoids are mounted within the control box 10 and are so aligned that an interconnected core 43 is common to them both. Compression spring 44 is interposed between solenoid 41 and a shouldered portion 45 on the core 43 and similarly compression spring 46 is interposed between the solenoid 42 and a shouldered portion 47 on core 43. The core 43 is thus biased to a neutral position, as shown in FIGURE 3, and when solenoid 41 is energized, will move to the left and when solenoid 42 is energized, it will move to the right from the position shown in FIGURE 3.

Figure 2:
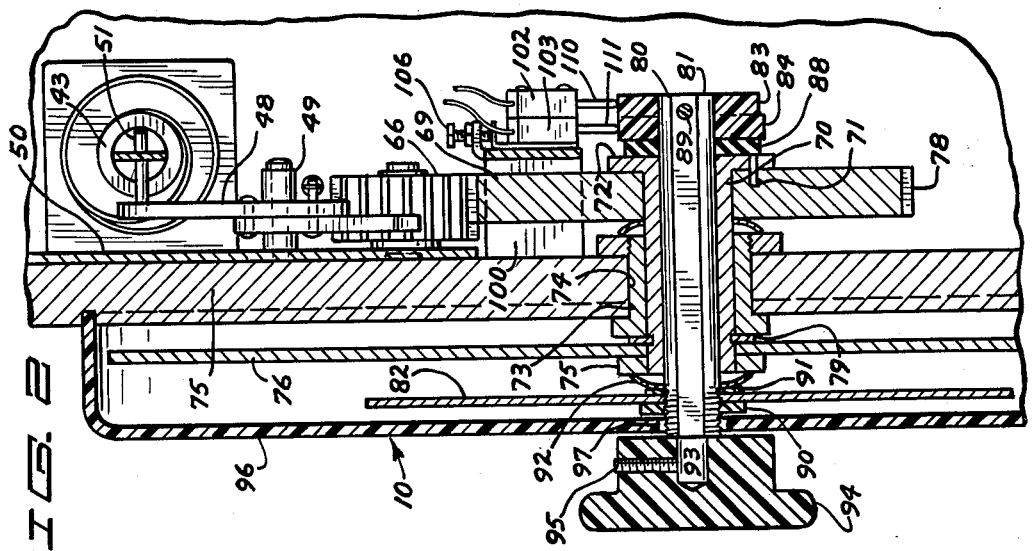
FIGURE 2 is an enlarged vertical section of a portion of the mechanism taken on the line 2—2 of FIGURE 1.
Figure 4:
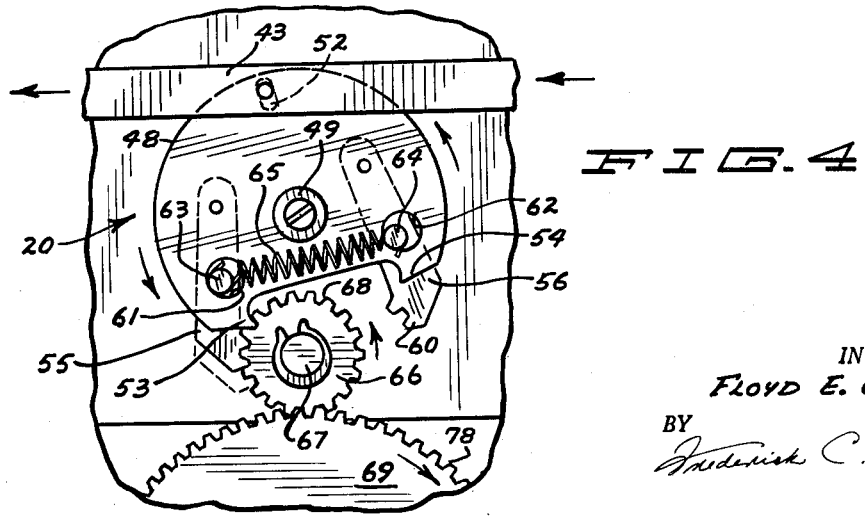
FIGURE 4 is an enlarged segmental view of the gear arrangement and gear driving element.

When either of the solenoids 41 or 42 is energized, the gear driving element 20 will be actuated. Referring to FIGURES 3 and 4, gear driving element 20 comprises a plate 48 rotatably mounted on a post 49 which in turn is secured to mounting panel 50 which also supports the solenoids 41 and 42 as shown in FIGURES 2 through 4. The plate 48 has a crank pin 51 which rides within a slot 52 formed centrally of the core 43. A pair of teeth 53 and 54 are formed peripherally in spaced relation on plate 48 as shown in FIGURES 3 and 4. A pair of pawls 55 and 56 are pivotally secured respectively at 57 and 58 to plate 48 and terminate respectively in pawl teeth 59 and 60. Openings 61 and 62 are formed through plate 48 and are adapted to overlie respectively pawls 55 and 56. Pawl 55 has a pin 63 extending through opening 61 and pawl 56 has a pin 64 extending through opening 62. A spring 65 interconnects the pins 63 and 64.

The gear driving element 20 lies in proximity to a pinion gear 66 which is rotatably mounted upon a stub shaft 67, secured in turn to mounting plate 50. When solenoid 41 is energized, the core 43 will be caused to move to the left as shown in FIGURES 3 and 4 thus causing pawl 55 to advance the pinion gear 66 by the amount of one of its teeth 68 in a direction of the arrow in FIGURE 4 and at the same time the pawl teeth 60 on pawl 56 will be retracted from engagement with the pinion gear 66. The movement of plate 48 is stopped by engagement of the pointed tooth 53 with pinion gear 66 and the gear 66 is thereby positively positioned with a precise advancement of one tooth. Since the gear driving element 20 is symmetrical, the entire advancing procedure will be reversed if the solenoid 42 is actuated. The pinion gear 66 then will be advanced by one tooth in the opposite direction for every pulse that is supplied to solenoid 42. The pinion gear 66 is intermeshed with indicator gear 69 which is turn is mounted upon sleeve 70 as shown in FIGURE 2. Sleeve 70 may be provided with a pin 71 which passes through the sleeve flange 72 and insures that indicator gear 69 will rotate positively together with sleeve 70 at all times. The sleeve 70 is rotatably mounted within bearing 73 which in turn is mounted within an opening 74 formed through the top wall 75 of control box 10. The sleeve 70 has a flanged forward portion 75 which retains the indicator dial 76 firmly mounted on the sleeve 70 so that it will rotate together with the sleeve and the indicator gear at 69. Indicator dial 76 is provided with numbered indicia 77 which corresponds to the number of sections 12 on the conveyor 11. The indicator gear 69 is selected such that there is exactly one tooth 78 thereon for every section and every number on the indicator dial 76. A washer 79 is interposed between the indicator dial 76 and the bearing 73 as shown in FIGURE 2.

Rotatably mounted within sleeve 70 is a shaft 80 having a flat longitudinal area 81 for keying thereon a selector pointer 82 and a pair of cams 83 and 84. Cam 83 is provided with a single lobe 85 whereas the cam 84 has approximately 180° of high surface 86 and the remaining 180° constituting low surface 87. A clutch disk 88 is interposed between cam 84 and sleeve 70 so that the shaft 80 will normally rotate with sleeve 70 but may be frictionally rotated independently thereof when it is desired. A pin 89 may be employed to secure the cams 83 and 84 from endwise displacement of the shaft 80.

The selector pointer 82 is similarly keyed to shaft 80 and is held in position by a nut 90 threadably retained at the outer end of shaft 80 so as to draw the selector pointer 82 against washer 91 and spring washer 92 which in turn bears against flange 75 of sleeve 70. The nut 90 and spring washer 92 determine the amount of force applied to clutch 88 so that selector pointer 82 can be moved frictionally as before described. The outermost end of shaft 80 is provided with a reduced portion 93 to which is secured a manual knob 94 by means of set screw 95. A transparent dial cover 96 covers the indicator dial 76 and selector pointer 82, and is provided with an opening 97 through which the outer reduced end 93 of shaft 82 can extend.

To the inside of the panel 75 is mounted a bracket 100 which bridges over the indicator gear 69 and is fastened by means such as screws 101 as shown in FIGURE 3. A pair of micro-switches 102 and 103 are secured to bracket 100 by means of mounting plate 104 which in turn is pivotally mounted at 105 to bracket 100 and may be pivotally advanced or retracted by means of thumb nut 106 passing threadably through ear 107 laterally extending from bracket 100 and bearing radially against the mounting plate 104. An arcuate slot 108 is formed in mounting plate 104 and a pin 109 is fastened to bracket 100 and extends through said slot to guide the plate 104 when it is adjusted. Micro-switch 102 has a cam switch arm 110 which contacts cam 83 while cam switch 103 has a switch arm 111 contacting cam 84 as shown in FIGURES 2 and 3. It is to be noted that while the relationship of selector pointer 82 and the cams 83 and 84 remain constant at all times, the indicator dial 76 and the indicator gear 69 may be changed so that the number of gear teeth 78 will vary in accordance with the number of sections on conveyor belt 11 and corresponding numbered indicia on the indicator dial. It is an important feature of the invention to provide for such variation by merely changing gears 69 and dials 76. For example, if the diameter of gear 69 is reduced to the dotted line circumference 112 as indicated in FIGURE 3, fewer teeth 78 may be utilized on the gear. The entire mounting plate 50 is then dropped so pinion gear 66 will again mesh with the new change gear at its pitch diameter 112. To accomplish this shifting adjustment, slots 113 are formed through mounting plate 50 and securing screws 114 pass therethrough and are threadably secured to the control box wall 75 as shown in FIGURE 3. The screws 114 may be merely loosened to permit the mounting plate 50 to drop and then again are tightened with the pinion gear 66 in driving contact with an indicator gear 69 having a different diameter and a different number of teeth 78.

Figure 1:
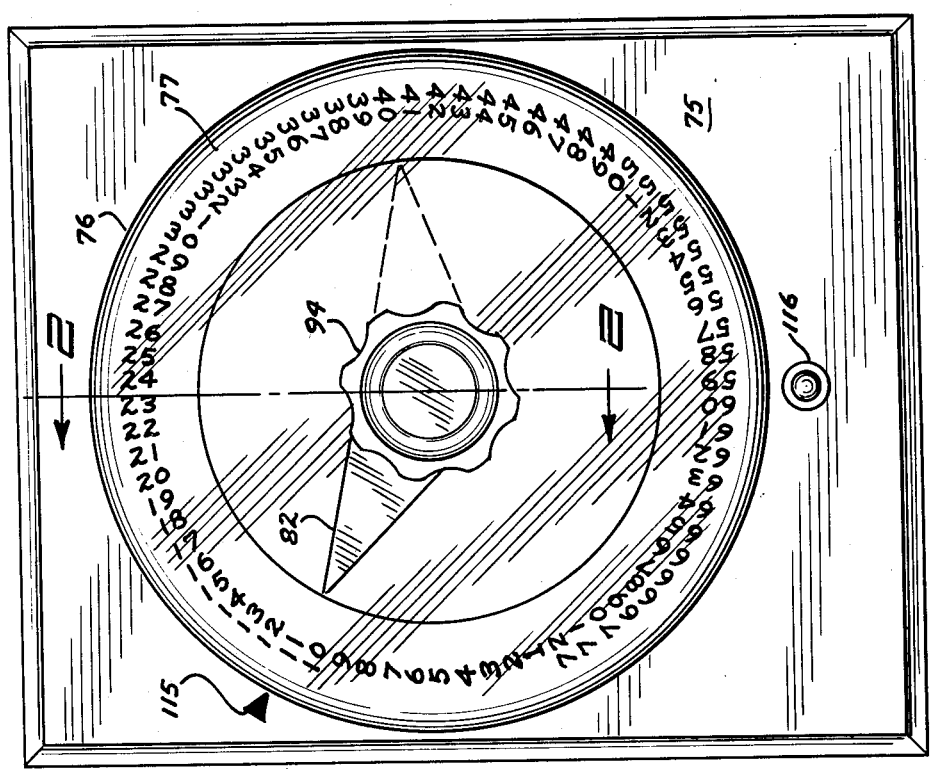
FIGURE 1 is a top plan view of the control unit showing the indicator dial and pointer elements.

In the operation of my conveyor, the control 10 as shown in FIGURES 1 through 3 indicates that section 11 is at the fixed call station represented by the pointer 115 affixed to the wall 75 of the control box. Now presuming it is desired to bring section 40 to the fixed call station indicated by the pointer 115, then the selector pointer 82 is rotated in a clockwise direction so that it will align with the numeral 40 as shown in dotted lines in FIGURE 1. Indicator gear 69 will not be rotated at this time and section 11 will remain in alignment with the pointer 115. Cams 83 and 84, however, will rotate with shaft 80 and as a result, the cam lobe 85 will move in a counterclockwise direction as viewed in FIGURE 3 thus causing switch arm 110 to fall to the lower position. Simultaneously therewith, the cam 84 will also rotate in a counterclockwise direction causing the switch arm 111 to rise upon the cam surface 86 where it will remain as long as the indicator pointer 82 lies in the dotted line position. With the control preset as indicated, the start button 116 on control box 10 is momentarily depressed. Referring now to the wiring diagram in FIGURE 8, switch 102 will have been rotated in a counterclockwise direction to complete a circuit from the hot direct current reduced voltage line 117 through line 118, switch 102, line 119 through start solenoid 120 in locking relay switch 121 through lead 122 and thence to the neutral direct current line 123 to cause the locking relay switch 121 to move downward and become latched in that position with the just described circuit being interrupted as the switch 121 assumes its lowermost position.

Since the cam 84 still maintains the high portion 86 in contact with micro-switch 103, a circuit will now be established from line 117 through normally closed switch 124, counterclockwise solenoid 125, conductor 126, relay switch 121, micro-switch 103, lead 122, and back to the neutral line 123. The instant the counterclockwise solenoid 125 is energized, it causes all of the counterclockwise switches in switch array 127 to be closed to energize motor 128 to rotate in a direction such as to move the belt conveyor 11 in the direction of the arrows as shown in FIGURE 5. The mechanical linkage by which motor drives the conveyor belt is not germane to this disclosure and hence it is not illustrated or described in detail. The motor 128 may operate from the alternating current lines 129 and 130 which maintain the motor 128 running in the direction indicated as long as switch array 127 remains closed. An electrical interlock is established with normally closed switch 131 which now becomes open to prevent accidental shorting of the motor conductors.

The alternating current lines 129 and 130 may conveniently form a source of energy for the direct current lower voltage lines 117 and 123 by energizing primary 132 of transformer 133 thus energizing secondary 134 and supplying direct current of lower voltage through rectifiers 135 and return neutral line 123 as previously described.

With the motor 128 energized and running in the direction indicated, conveyor belt 11 will trave lin the direction of the arrow causing the abutments 19 to successively strike the finger 18 and each time cause an electrical pulse to be passed through micro-switch 38 as shown in FIGURE 5. Turning again to the wiring diagram of FIGURE 8, each time the switch 38 is closed, a pulse will be transmitted from line 117, through conductor 136, through solenoid 41, thence through lead 122 to line 123. Each time solenoid 41 is pulsed, the pinion gear 66 will be advanced one tooth in the direction of the arrows as shown in FIGURE 4.

Indicator gear 69, indicator dial 76, selector pointer 82 and cams 83 and 84 will all rotate together in a clockwise direction as viewed in FIGURES 3 and 4 until the lobe 85 of cam 83 actuates micro-switch 102 as shown in FIGURE 8. At this point, a circuit will be established through line 117, conductor 118, the lower contacts of switch 102, and conductor 137 to energize the stop solenoid 138 in locking relay switch 121, thence through the lowermost contacts of switch 121 to lead 122 and back to neutral line 123. It will be remembered that the locking relay switch 121 has been in the lower position but with the momentary energization of stop solenoid 138, the switch will again rise towards the upper position and become locked therein as shown in FIGURE 8. At this point, the counterclockwise solenoid 125 will become de-energized since conductor 126 will be interrupted in its circuit through relay switch 121. The counterclockwise switch array 127 will thus become open and motor 128 will stop and cause the conveyor belt 11 to stop.

Now, presuming that selector pointer 82 had been turned to such position as would have placed spring pressed micro-switch arm 111 in contact with the lower surface 87 of cam 84, then when start switch 116 is momentarily pressed, a new circuit is established through line 117, conductor 118, switch 102, conductor 119, the upper contacts of switch 102, start solenoid 120, the second from the bottom contacts of solenoid switch 121, conductor 122 and back to the neutral line 123. Solenoid switch 121 then snaps to the lower position and becomes locked so as to establish a circuit from line 117 through closed switch 131, clockwise solenoid 139, conductor 140, relay switch 121, micro-switch 103, lead 122 and thence back to line 123. The energization of solenoid 139 closes the clockwise switch array 141 for energizing motor 128 in a clockwise direction to drive the conveyor belt 11 in a direction opposite that of the arrow in FIGURE 5. An electrical interlock is so established that normally closed switch 124 becomes simultaneously opened to prevent double energization of the two switch arrays.

Now with the belt 11 running in the opposite direction, the abutments 19 will strike the finger 18 of sensing element 17 from the right as shown in FIGURE 5 and micro-switch 35 will be closed as each conveyor section represented by the abutment 19 passes the sensing element. Referring again to FIGURE 8, each time the micro-switch 35 is closed, a pulse will be transmitted from line 117 to conductor 142, solenoid 42, lead 122, and back to the neutral line 123. Each time the solenoid 42 is pulsed, the gear driving element will be actuated in a direction the reverse of that shown in FIGURE 4 so as to rotate pinion gear 65 one tooth at a time in a clockwise direction. Indicator gear 69 will then be driven in a counterclockwise direction. It will be remembered that cam 84 contacts its switch arm 111 at the lower portion 87 and will remain at this level until lobe 85 of cam 83 again depresses switch 102, as shown in FIGURE 8, to raise the locking relay switch 121 and stop the conveyor drive motor 128. Whatever section has been preselected on the dial 76 will now be aligned with the fixed station pointer 115 so that articles may be processed, removed from or suspended from the appropriate hanger 12. No matter what section number has been preselected, the conveyor belt 11 will run in a direction which will quickly carry the section to the fixed station.

On occasion, it may be desired to cause the belt 11 to run to the left or the right a given number of sections without preselecting a number on the selector dial. For this purpose, a manual switch 143 may be interposed directly from the clockwise motor control solenoid 139 to the neutral line 123. Similarly, switch 144 is interposed across the counterclockwise motor control solenoid switch 125 and neutral line 123, the motor 128 thus being energized to rotate in the desired direction without regard as to the setting of the switch 103. It is understood, however, that the sensing unit 17 will continue to operate at all times causing the indicator dial 76 to register the movement of conveyor belt 11.

In the event a conveyor 11 were selected with a lesser number of sections and corresponding abutments 19, then a new change gear 69 would be employed having a number of gear teeth 78 corresponding to the changed number of sections on the belt conveyor. Since the new circumference of gear 69 would lie at some circle 112, as shown in dotted lines in FIGURE 3, the mounting panel 50 would then be lowered, after loosening bolts 114, so that pinion gear 66 would again mesh with teeth 78. The indicia 77 on indicator dial 76 would also be changed to correspond to the new number of sections but all the other mechanism and the operation of the control remain the same and become adaptable to the changed number of sections.

It will, of course, be understood that various changes may be made in the form, details, arrangements and proportions of the parts without departing from the scope of my invention as set forth in the appended claims.

What is claimed is:

1. A conveyor control mechanism for use with a powered conveyor having a series of article holding sections, any one of which is subject to call to a fixed station, said control mechanism comprising, a sensing element actuated by the passage of each section of a conveyor, a driving element, means for advancing said driving element by a predetermined increment each time said sensing element is actuated, indicator means having presettable character to indicate a selected article holding section from a number of characters representative of said series of article holding sections, and means operated by said indicator means for stopping the conveyor when the indicator means has been moved to an index position representing said fixed station.

2. A conveyor control mechanism for use with a powered conveyor having a series of article holding sections, any one of which is subject to call to a fixed station, said control mechanism comprising, a sensing element responsive to the passage of each section of a conveyor, a gear driving element intermittently actuated by said sensing element, indicator means having spaced indicia thereon representative of said series of article holding sections rotatably driven by said gear driving element, and means operated by said indicator means for stopping the conveyor when said indicator means has been rotated to an index position representing a fixed station.

3. A conveyor control mechanism for use with a powered conveyor having a series of article holding sections, any one of which is subject to call to a fixed station, said control mechanism comprising, a sensing element responsive to the passage of each section of a conveyor, a gear driving element intermittently actuated by said sensing element, a dial having circumferential indicia corresponding to the sections of said conveyor, a selector knob rotatably mounted axially with respect to said section dial, said section dial and said selector knob being rotatably driven by said gear driving element, and means rotatable with said dial for causing the conveyor to stop when said section dial and said selector knob have been rotated to an index position representing a fixed station.

4. A conveyor control mechanism for use with a powered conveyor having a series of article holding sections, any one of which is subject to call to a fixed station, said control mechanism comprising, a fixed sensing element mounted adjacent a conveyor, a plurality of sensing actuators mounted one each on a conveyor for successive engagement by the article holding sections, and actuating said fixed sensing element when passing adjacent thereto, a gear driving element intermittently actuated by said sensing element, indicator means having presettable character to indicate a selected article holding section from a number of characters representative of said series of article holding sections, and means operated by said indicator means to stop the conveyor when the indicator means has been driven to an index position representing the fixed station.

5. A conveyor control mechanism for use with a powered conveyor having a series of article holding sections, any one of which is subject to call to a fixed station, said control mechanism comprising, a fixed sensing element mounted adjacent the conveyor and having a pair of switches, one of said switches being actuated each time an article holding section passes the control mechanism in one direction and the other switch being similarly actuated when the conveyor moves in the opposite direction, a gear driving element intermittently actuated by one of said pair of switches and advanced by a predetermined increment in one direction each time said switch is actuated and by a predetermined increment in the other direction each time the other of said pair of switches is actuated, indicator means having presettable character to indicate a selected article holding section from a number of characters representative of said series of article holding sections, and means operated by said indicator means for stopping the conveyor when the indicator means has been moved to an index position respecting the fixed station.

6. A conveyor control mechanism for use with a motor powered conveyor having a series of article holding sections, any one of which is subject to call to a fixed station, said control mechanism comprising, a fixed sensing element for sensing the passage of each section of a conveyor, a gear driving element actuated by said sensing element for the passage of each conveyor section, a pinion gear rotatably mounted adjacent said gear driving element and advanced in a stepwise increment for each actuation of said gear driving element, and an indicator gear driven by said pinion gear and having teeth consecutively corresponding to the conveyor sections.

7. A conveyor control mechanism for use with a motor powered conveyor having a series of article holding sections, any one of which is subject to call to a fixed station, said control mechanism comprising, a fixed sensing element for sensing the passage of each section of a conveyor, a pinion gear rotatably mounted on said control mechanism, a solenoid ratchet mechanism for advancing said pinion gear by one tooth each time the sensing element senses the passage of a conveyor section, a driving gear rotatably mounted in engagement with said pinion gear and having teeth consecutively corresponding to the conveyor sections.

8. A controlled conveyor system comprising, a frame, an elongated endless conveyor having contiguous interconnecting sections suspended on said frame for travel with respect thereto, said sections each having a protuberance adapted to travel with said conveyor in a common path, a motor drivably connected to said conveyor for moving the same, a sensing element mounted on said frame and having a portion lying in the common path and actuated by a protuberance as each section moves past said sensing element, a driving element intermittently actuated by the sensing element, an indicator means presettable to indicate a selected conveyor section, and means operated by said indicator means for stopping the conveyor when said indicator means has been rotated to an index position representing the arrival of said selected conveyor section to a predetermined station.

9. The controlled conveyor system of claim 8 wherein said driving element comprises a pinion gear and an indicator gear engaged therewith, said indicator gear having teeth consecutively corresponding to said conveyor sections.

References Cited in the file of this patent

UNITED STATES PATENTS

| | | |
|---|---|---|
| 1,577,944 | Reisbach | Oct. 20, 1925 |
| 1,950,647 | Bailer | Mar. 13, 1934 |
| 2,087,860 | Nichols | July 20, 1937 |
| 2,406,726 | Weimont | Aug. 27, 1946 |
| 2,430,935 | Klug | Nov. 18, 1947 |
| 2,441,767 | Johansson | May 18, 1948 |
| 2,846,144 | Austin et al. | Aug. 5, 1958 |